Nov. 10, 1953 M. J. CAPARONE ET AL 2,658,686
COMBINED THERMOSTAT AND AUTOMATIC PILOT CONTROL
Filed May 15, 1951 3 Sheets-Sheet 1

INVENTORS
MICHAEL J. CAPARONE, &
CHARLES M. VAUGHN.
BY
their
ATTORNEY

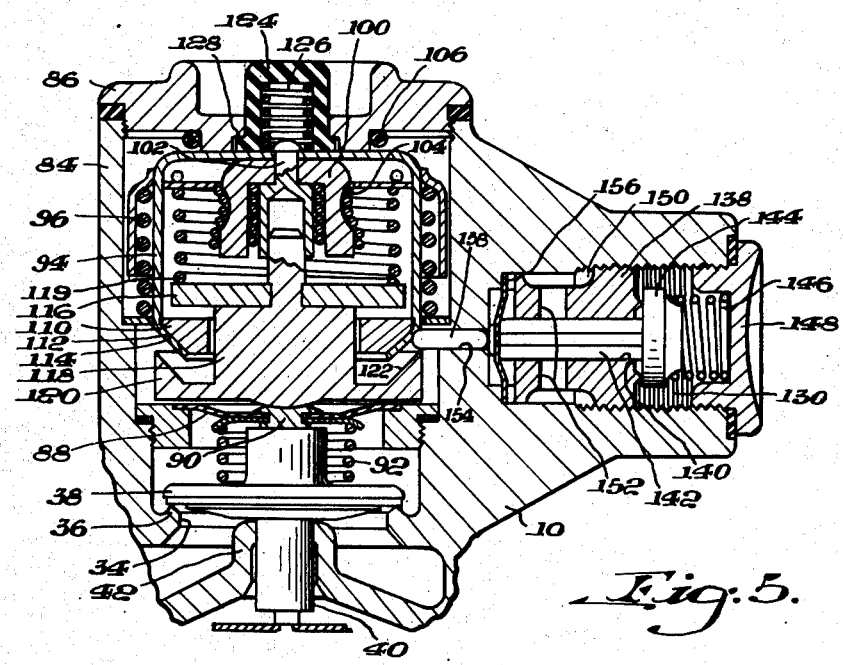

Patented Nov. 10, 1953

2,658,686

UNITED STATES PATENT OFFICE 2,658,686

COMBINED THERMOSTAT AND AUTOMATIC PILOT CONTROL

Michael J. Caparone, Arcadia, and Charles M. Vaughn, Los Angeles, Calif., assignors to Robertshaw-Fulton Controls Company, Greensburg, Pa., a corporation of Delaware Application May 15, 1951, Serial No. 226,506

4 Claims. (Cl. 236—21)

This invention relates to combination controls for gaseous fuel burners and more particularly to controls wherein the temperature controlling device and the safety shut off both operate on the same control valve and the safety shut-off device also operates a pilot valve.

The present invention is characterized by a movable electromagnet which picks up its armature in response to energization by a condition responsive device when the electromagnet is moved into engagement with the armature, the electromagnet with the armature in its attracted position returning to its initial position upon completion of this resetting operation. With the armature in attracted position, the control valve is free to be moved between closed and open positions by the thermostat which may be of the rod-and-tube type operating through a snap-action mechanism. However, when a preselected condition is established, such as the extinguishment of the pilot flame, the electromagnet is de-energized and the armature is released to return under spring bias to its original position. The return movement of the armature is in a path substantially coaxial with the valve member so that the latter is moved to closed position should the thermostat be holding it open. In this respect, the control is similar to that disclosed and claimed in the copending application of Wilbur F. Jackson, Serial No. 98,486, filed June 11, 1949, now Patent No. 2,604,266. The pilot valve is disposed laterally of the electromagnet and has an operating member operatively associated therewith for positioning the pilot valve to admit fuel to the pilot burner only during the resetting operation and while the armature is in attracted position.

It is a principal object of this invention to provide 100% shut-off of fuel to all burners upon failure of the pilot flame.

Another object of this invention is to prevent flow of fuel to the main burner while permitting flow of fuel to the pilot burner during the resetting operation.

Other objects and advantages will appear from the following specification taken in conjunction with the accompanying drawings wherein:

Figs. 4 and 5 are similar to Fig. 3 with the parts of the device shown in different operating positions.

Figures 1, 3:
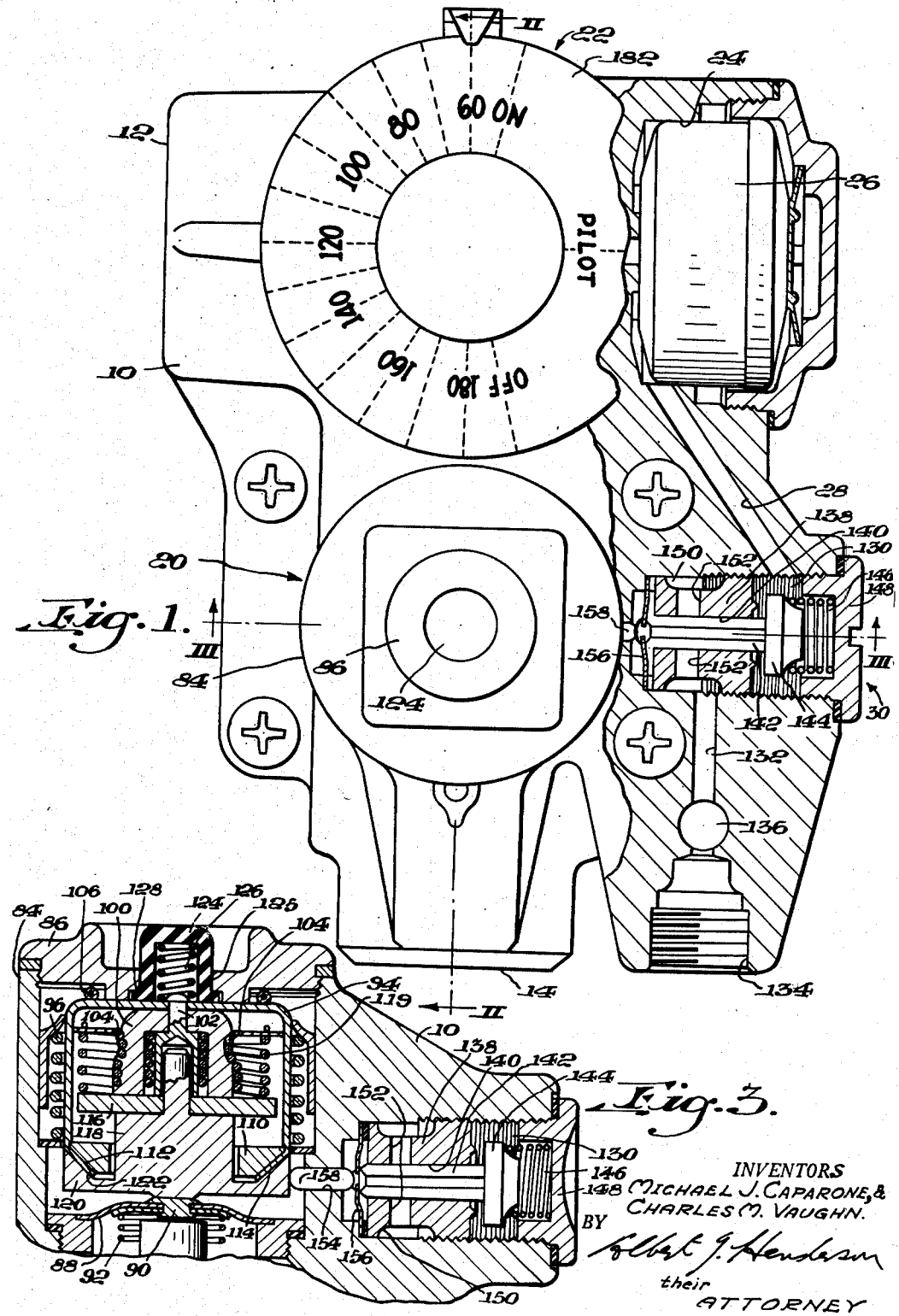
Fig. 1 is a plan view of a control device embodying this invention with a portion thereof shown in section.
Fig. 3 is a fragmentary sectional view taken on the line III—III of Fig. 1.
Figure 2:
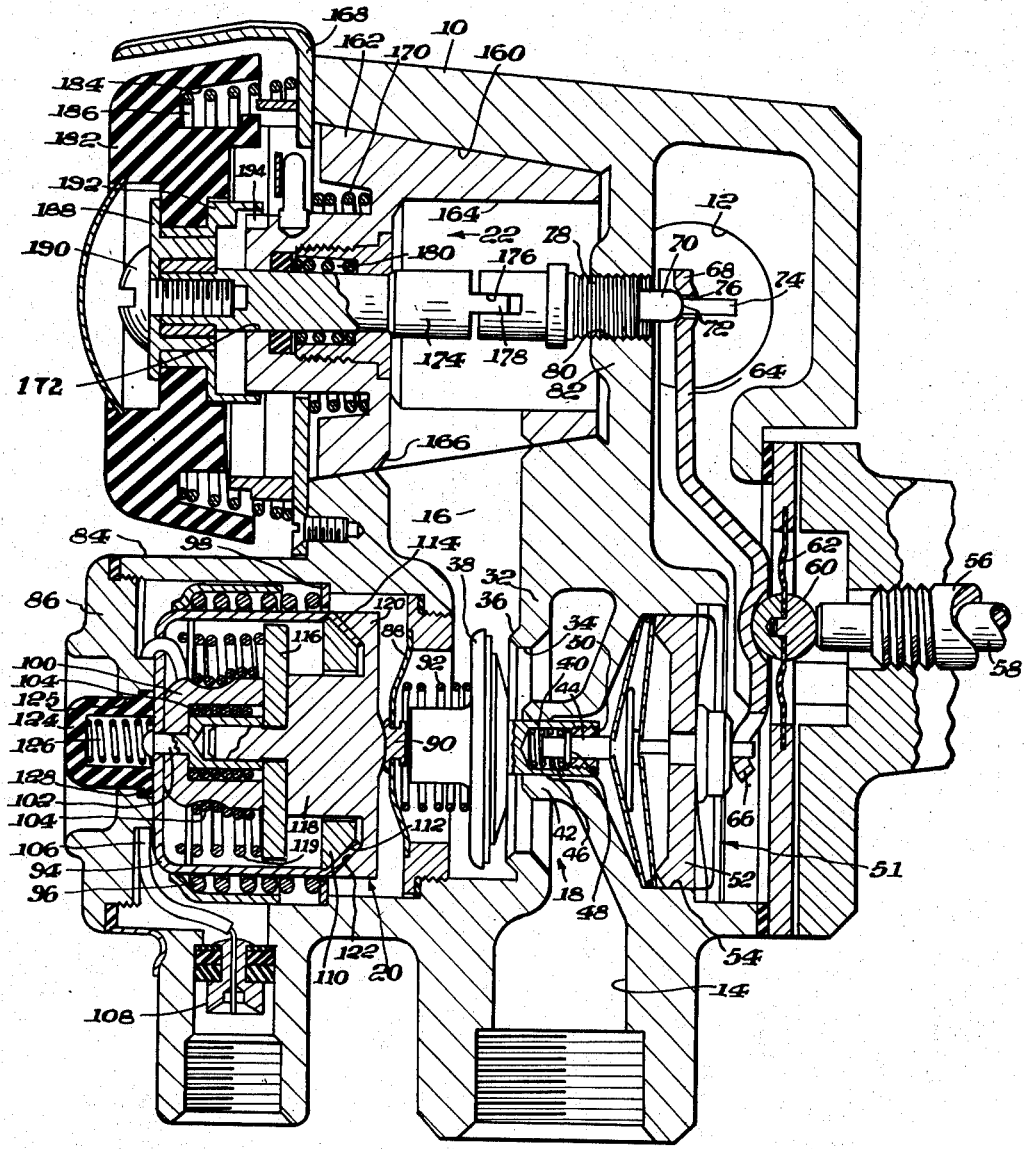
Fig. 2 is a sectional view taken on the line II—II of Fig. 1.

Referring to Figs. 1 and 2, the control device structure comprises a casing 10 provided with an inlet 12 and an outlet 14 connected by a main fuel passage 16. The flow of fluid fuel in the passage 16 is under the control of a thermostatically controlled valve 18 which has associated therewith a safety shut-off device 20 operable in response to a predetermined condition for preventing flow of fuel through the passage 16.

Interposed in the passage 16 between the inlet 12 and the thermostatically controlled valve 18 is a main shut-off valve 22 which is movable between positions for controlling the flow of fuel in the passage 16. The main shut-off valve 22 may also control the flow of fuel to a filter chamber 24 containing a filter 26 and communicating with an auxiliary passage 28 formed in the casing 10 which passage in turn communicates with the inlet of the valve chamber of a pilot valve 30 controlling the flow of fuel to a pilot burner (not shown). The pilot valve 30 is operatively associated with the safety shut-off device 20 as will more fully appear.

The thermostatically controlled valve 18 may comprise a partition 32 traversing the passage 16 and having a port 34 formed therein. A valve seat 36 formed on the partition 32 around the port 34 is cooperable with a reciprocable valve member 38 to close the port 34. The valve member 38 is here shown as being of the disk type and mounted upon a hollow valve stem 40 which slidably extends through an axial hollow boss 42 carried by the casing 10 in axial alignment with the port 34. The port 34 in the partition 32 provides communication between the main fuel passage 16 and the outlet 14 and the valve member 38 is normally biased toward the seat 36 to close such communication by means to be more fully described.

The hollow valve stem 40 contains an override mechanism comprising a plunger 44 and biasing spring 46 which serves to urge a collar 48 on the plunger 44 into engagement with a bushing 50 closing the inner end of the hollow valve stem 40. The plunger 44 projects through the bushing 50 for operative engagement with a snap-action mechanism 51 of well known form including a thrust element 52 which is disposed in a recess 54 formed in the casing 10 in axial alignment with the port 34. The snap-action mechanism 51 imparts a snap-action movement to the valve member 38 in a manner well known in the art.

Thermally responsive actuating means is provided for moving the valve member 38 between controlling positions and may include a thermal element of the rod-and-tube type with a tube 56 of expansible material secured to the casing 10 and a rod 58 of relatively nonexpansive material extending into the casing 10 and being free to move relative thereto.

The free end of the rod 58 is in engagement with a bearing element 60 carried by a diaphragm seal 62 and the bearing element 60 in turn abuts a lever 64 intermediate the ends thereof. One end 66 of the lever 64 operatively engages the thrust element 52 of the snap-action mechanism 51 and the other end 68 of the lever 64 is seated on an adjustable fulcrum element 70. The fulcrum element 70 is provided with a spherical bearing surface 72 which engages a complementary seat formed in the end 68 of the lever 64. Supported on and coaxial with the fulcrum element 70 is a pintle 74 which extends through an aperture 76 formed in the lever 64 to maintain the lever 64 in position on the bearing surface 72. The fulcrum element 70 is carried by a rotatable adjusting element 78 threaded into an aperture 80 formed in a spider 82 which is carried by the casing 10 and disposed within the inlet 12.

It will be apparent to those skilled in the art that rotation of the adjusting element 78 relative to the casing 10 will effect axial movement thereof to adjust the fulcrum 70 through a range of positions and that the temperature at which the rod-and-tube element 56, 58 will cause actuation of the snap-action mechanism 51 and valve member 38 will be determined by the position of the fulcrum member 70. Since temperature setting and actuating mechanisms for thermostatically controlled valves of the type herein disclosed are well known in the art, a detailed description of the operation thereof is deemed unnecessary.

Electromagnetic means is provided for moving the valve member 38 to closed position in response to a predetermined condition, preferably extinguishment of the pilot burner flame, regardless of the thermal condition of the thermostat 56, 58. To this end, a magnet housing is provided and takes the form of an elongated annular boss 84 formed on the casing 10 in axial alignment with the valve port 34 on the side of the valve member 38 opposite the snap-action mechanism 51. One end of the boss 84 is closed by a suitable cap 86 threaded therein and the interior of the boss 84 communicates with the main passage 16. A flexible sealing disk 88 extends across the interior of the annular boss 84 at its junction with the main passage 16 for closing the communication therebetween. Thus, passage of fluid from the main fuel passage 16 to the interior of the annular boss 84 is prevented.

The sealing disk 88 carries an axially located rivet 90 which is biased away from the valve member 38 by a coil spring 92 acting between the sealing disk 88 and the valve member 38. The spring 92 also serves to bias the valve member 38 toward the seat 36 as previously indicated.

A cup-shaped magnet cover 94 is mounted within the annular boss 84 for slidable movement therein toward and away from the sealing disc 88. The cover 94 is biased toward the cap 86 by a coil spring 96 operative between the cover 94 and a snap ring 98 secured to the inner periphery of the annular boss 84. An electromagnet comprising a horseshoe frame 100 has its bight secured to the closed end of the cover 94 by a rivet 102 extending through these members. The usual winding has one end secured to the rivet 102 to provide a ground connection and the winding continues in the form of a pair of coils 104 respectively encompassing the legs of the horseshoe frame 100. The opposite end of the magnet winding extends through a suitable aperture in the cover 94 to the exterior thereof and is formed into a loop 106 between the base of the cover 94 and the cap 86. The looped end is secured in a socket 108 which is adapted for electrical connection to a source of electrical energy which source may comprise a thermocouple (not shown) having a hot junction adapted for exposure to a flame at the pilot burner.

The end of the magnet cover 94 opposite the end supporting the magnet frame 100 is open and an annular bearing element 110 is mounted therein. The outer edge 112 of the bearing element 110 is beveled and the end portion 114 of the cover 94 is staked or bent over the same to clamp the bearing element 110 against axial movement. Since the beveled edge 112 of the annular bearing element 110 is in engagement with the end portion 114 of the magnet cover 94, the inturned end portion 114 is maintained rigid for a purpose which will more fully appear.

An armature 116 is supported within the magnet cover 94 on an armature stem 118 and is separable from the pole faces of the magnet 100 for movement between attracted and released positions. The armature stem 118 is slidably supported in the annular bearing element 110 and projects out of the cover into abutting engagement with the rivet 90 on the sealing disk 88. The armature 116 is biased to its released position by a coil spring 119 operable between the cover 94 and the armature. As the spring 119 is considerably stronger than the valve spring 92, sufficient force is exerted thereby on the valve member 38 to hold the same in its closed position relative to the valve seat 36 whenever the armature 116 is disengaged from the pole faces of the magnet 100. It should be observed, however, that the coil spring 96 is considerably stronger than the armature spring 119 for a purpose which will more fully appear.

The end of the armature stem 118 which projects from the magnet cover 94 is provided with a radially extending flange 120 the diameter of which is equal to the diameter of the magnet cover 94. The face 122 of the flange 120 adjacent the end of the magnet cover 94 is formed to be complementary with the inturned end portion 114 of the magnet cover 94 and the flange 120 is so positioned on the armature stem 118 relative to the armature 116 that when the armature 116 is in engagement with the pole faces of the magnet 100, the face 122 of the flange 120 is contiguous to the inturned end portion 114 of the magnet cover 94 for a purpose which will more fully appear.

In devices of this type wherein a thermocouple adapted to be heated by the pilot flame is utilized to generate the electrical energy, the energy so generated is insufficient to attract the armature 116 from its released position but is sufficient to hold the same in its attracted position after the usual resetting operation has been conducted. Consequently, manual resetting means is provided for moving the magnet 100 into engagement with the armature 116 and takes the form of a resetting button 124 which projects through a suitable opening 125 in the cap 86 and engages at its inner end with the magnet cover 94. A coil spring 126 is housed within the button 124 and engages at its inner end with the magnet cover 94 for biasing the button 124 outwardly of the magnet cover 94. A flange 128 is formed on the inner end of the button 124 for cooperation with a portion of the cap 86 to prevent ejection of the button 124 under the bias of the spring 126.

To obtain 100% shut off of fuel to all burners, the auxiliary or pilot valve 30 is operatively associated with the electromagnetic shut-off device 20 so that the pilot valve is in open position only while the resetting means is in operation and while the armature 116 is in the attracted position.

The pilot valve 30 may take the form of a pilot valve chamber 130 formed in the casing 10 laterally of the annular boss 84. The pilot valve chamber 130 communicates with the auxiliary passage 28 and with a pilot passage 132 formed in the casing 10 and communicating with an outlet 134 adapted for connection to the pilot burner (not shown). The rate of flow through the pilot passage 132 may be regulated by the usual needle valve 136 of any suitable form.

An annular valve seat member 138 is positioned in the valve chamber 130 in threaded engagement with the walls thereof to intercept flow of fluid therethrough and is provided with a centrally disposed valve port 140 having a circular cross section. Slidably carried in the valve port 140 is a non-circular valve stem 142 which carries a disk valve member 144 at one end. A spring 146 acting between the valve member 144 and a cap 148 threaded into the open end of the valve chamber 130 serves to bias the valve member 144 toward the valve seat member 138.

When the valve member 144 is in its biased position and in engagement with the valve seat member 138, fluid flow through the valve chamber 130 is prevented. Conversely, when the valve member 144 is positioned away from the valve seat 138, fuel is permitted to flow from one side of the valve seat member 138 to the other side thereof through the valve port 140, passing between the surface of the non-circular valve stem 142 and the walls of the port 140. Communication is established between the pilot passage 132 and the valve port 140 by an annular groove 150 formed in the valve seat member 138 to register with the pilot passage 132 and connected to the valve port 140 by a plurality of radially extending bores 152. Thus, fuel flowing through the valve port 140 passes through the bores 152, the groove 150, and the pilot passage 132 to the pilot burner (not shown) so that the flow of fuel to the pilot burner is controlled by the valve member 144.

The end of the valve chamber 130 opposite the end closed by the cap 148 registers with a bore 154 formed in the casing 10 and opening into the interior of the annular boss 84. Communication between the valve chamber 130 and the interior of the annular boss 84 is prevented by a flexible sealing disk 156 which is clamped across the open end of the valve chamber 130 by the annular valve seat member 138. Abutting one side of the flexible disk 156 is the free end of the valve stem 142 and abutting the other side of the disk 156 is one end of an operating member here shown as a pin 158 slidably carried in the bore 154. The axes of the bore 154 and the pin 158 are substantially normal to the axis of the armature stem 118 and the other end of the pin 158 extends into the interior of the annular boss 84 to alternatively contact the end portion 114 of the magnet cover 94 or the peripheral surface of the flange 120 as will be more fully brought out in a discussion of the operation of the device.

The main shut-off valve 22 is here shown as being of the plug type and comprises a tapered valve seat 160 formed in the casing 10 for receiving a plug valve member 162. The valve member 162 is provided with an angular passage 164 one end of which is in constant communication with the inlet 12 and the other end of which forms an opening 166 in the side of the valve member 162. The opening 166 is adapted to be closed by the surface of the valve seat 160 in one position of the valve member 162, to register with the opening to the pilot filter chamber 24 in another position of the valve member 162 to provide a "Pilot" position, and to register with the passage 16 and the opening to the pilot filter chamber 24 in still another position of the valve member 162 to provide a full-open or "on" position in a manner well known in the art.

Interposed between the valve member 162 and a cover plate 168 secured to the casing 10 is a spring 170 which serves to bias the valve member 162 against the valve seat 160 sufficient to establish a fluid sealing but rotatable relation therebetween.

Rotatably mounted in a bore 172 formed in the valve member 162 along the axis thereof is a shaft 174 which extends into the passage 164 and into engagement with the adjusting element 78 of the thermostat. A slot 176 formed in the adjusting element 78 slidingly receives a rectangular extension 178 of the shaft 174 to provide a slidably torque transmitting connection between the shaft 174 and the adjusting element 78. Rotation of the shaft 174 will thus produce rotational and consequent axial movement of the adjusting element 78 without corresponding axial movement of the shaft 174. Leakage through the bore 172 is prevented by a suitable stuffing box 180.

To provide for rotation of the shaft 174, a rotatable control element or knob 182 is affixed to that end of the shaft 174 which extends out of the valve member 162. The knob 182 is mounted on the shaft 174 to be rotatable therewith and movable axially thereof through a limited distance and is provided on its underside with an annular groove 184. A coil spring 186 acting between the cover plate 168 and the knob 182 extends into the groove 184 and serves to bias the knob 182 to the outermost end of the shaft 174 and into engagement with a plate 188 which is secured to the end of the shaft 174 by a screw 190.

When the knob 182 is retained by the spring 186 in its biased position bearing against the plate 188, the knob 182 and its associated shaft 174 are free to rotate relative to the valve member 162. However, clutch means is provided for establishing a torque transmitting relation between the knob 182 and the valve member 162 when the knob 182 is moved axially of the shaft 174 against the bias of the spring 186 to a depressed position. The clutch means may take the form of a single clutch tooth 192 depending from the underside of the knob 182 to be movable therewith into a complementary recess 194 formed in the valve member 162, engagement of the clutch tooth 192 with the walls of the recess 194 being effective to establish a positive driving connection between the knob 182 and the valve member 162 when the knob 182 is in its depressed position.

It will be apparent that the knob 182 is effective in its biased position to adjust the temperature setting of the thermostat without disturbing the setting of the valve member 162, while in its depressed position, it is effective to adjust the position of the valve member 162. The combination shut-off cock and thermostat adjusting device of the type herein disclosed is fully disclosed and claimed in the copending application of Samuel G. Eskin and Adele M. Arkelyan, Serial No. 230,612, filed June 8, 1951.

Operation

When no fuel is flowing to the main or pilot burners, the various parts of the control device are positioned as shown in Fig. 5. The armature 116 is in its released position with the armature stem 118 acting under the bias of the spring 119 to hold the valve member 38 against the valve seat 36 and the pin 158 engaging the inturned end portion 114 of the magnet cover 94 to permit the pilot valve member 144 to engage the valve seat 138 under the bias of the spring 146.

To place the control device in operative condition, the knob 182 is depressed and rotated to position the valve member 162 to the "Pilot" position wherein the angular passage 164 establishes communication between the inlet 12 and the pilot filter chamber 124. In such position of the valve member 162, fuel will flow from the inlet 12 through the angular passage 164 in the valve member 162, the filter 26 in the filter chamber 24 and through the passage 28 to the pilot valve chamber 130.

The resetting operation is then conducted by applying manual pressure to the button 124 for moving the magnet cover 94 and the magnet 100 jointly relative to the armature 116 to position shown in Fig. 4. During this movement, the coil springs 96 and 119 are compressed, and the pin 158 is forced to ride up the frustro-conical surface of the inturned end portion 114 of the magnet cover 94, the end portion 114 acting as a cam surface.

The pin 158 is thus moved laterally relative to the armature stem 118 to move the valve stem 142 against the bias of the spring 146 to position the pilot valve member 144 in its open position away from the valve seat 138. Fuel will then flow through the valve port 140, bores 152, groove 150, and pilot passage 132 to the pilot burner (not shown) where it may be ignited by a match or the like.

The flame at the pilot burner may heat the hot junction of the thermocouple (not shown) to cause the same to develop sufficient current to energize the winding 104 of the electromagnet. The reset button 124 is then released and the bias of the spring 96 serves to retract the magnet cover 94 and the magnet 100 to their initial positions. However, the armature 116 is now carried along with the magnet 100 and the coil spring 119 is retained in its compressed condition. The various parts of the device are now as shown in Figs. 2 and 3.

It will be apparent that the armature stem 116 can no longer exert a force on the rivet 90 carried by the sealing disk 88 so that the valve member 38 is freed for movement to open position relative to the valve seat 36. It will also be apparent that when the armature 116 is in its attracted position and thus movable with the magnet 100, the flange 120 carried by the armature stem 118 is also movable with the magnet 100 and magnet cover 94 so that the flange 120 is returned with the magnet cover 94, the face of the flange 120 remaining contiguous to the inturned end portion 114 of the magnet cover 94. Thus, upon completion of the resetting operation, the flange 120 is positioned to engage the pin 158 to prevent the pin 158 from riding down the frusto-conical cam surface of the end portion 114 of the magnet cover 94 under the bias of the spring 146 and the valve member 144 is maintained in its open position.

The main valve member 162 may now be rotated to a position wherein the angular passage 164 formed therein is in communication with the inlet 12, the pilot filter chamber 24 and the main fuel passage 16.

Upon a demand for heat, the rod 58 exerts a force on the thrust element 52 of the snap-action mechanism 51 and the snap-action mechanism opens the valve member 38 against the bias of the valve spring 92. Flow of fuel from the inlet 12 through the main fuel passage 16 and the valve port 34 to the outlet 14 is now permitted and operation of the main burner in the usual manner can occur.

When the temperature sensed by the thermostat 56, 58 reaches that for which the adjustment has been set, closure of the valve member 38 occurs under bias of the spring 92 and is permitted due to reverse positioning of the snap-action mechanism as is well known to those skilled in the art. During this normal reciprocation of the valve member 38 in controlling flow of fuel to the outlet 14, the armature 116 remains engaged with the pole faces of the magnet 100.

In the event that the flame at the pilot burner is extinguished, the supply of current to the electromagnet will be cut off and, upon deenergization of the electromagnet, the armature 116 will move away from the pole faces of the magnet 100. Such movement of the armature 116 is due to the bias of the coil spring 119 and serves to bring the armature stem 118 into operative engagement with the rivet 90 carried by the sealing disk 88 to force the rivet 90 into engagement with the valve member 38 and cause closure thereof. As previously indicated, such closure will occur regardless of whether the thermostat 56, 58 is operated to hold the valve member 38 in open position due to the provision of the override connection within the hollow valve stem 40, the bias of the override spring 46 being overcome upon release of the armature 116 by the stronger bias exerted by the coil spring 119. The hollow stem 40 moves relatively to the plunger 44 during compression of the override spring 46 without causing reverse operation of the snap-action mechanism 51 as in normal thermostatic operation.

Movement of the armature 116 from attracted to released position will also cause the armature stem 118 to move relative to the pin 158 and carry the flange 120 out of engagement with the pin 158. Since the pin 158 is no longer restrained by the flange 120, it is moved laterally relative to the armature stem 118 under the bias of the spring 146 to permit the pilot valve member 144 to move into engagement with the valve seat 138 thereby cutting off the flow of fuel to the pilot burner. The various parts of the control device are now positioned as shown in Fig. 5 and no fuel can flow to any of the burners.

It will be apparent from the foregoing that the illustrated embodiments provide 100% shut off of fuel to all burners upon failure of the pilot flame. It will also be apparent that the illustrated embodiments prevent flow of fuel to the main burner while permitting flow of fuel to a pilot burner during the resetting operation and accordingly accomplish the objects of the invention. On the other hand, it will be understood that many changes may be made in the details of construction and arrangement of parts to accomplish the purposes of this invention without departing from the scope of the invention as defined in the appended claims.

It is claimed and desired to secure by Letters Patent:

1. In a control device, the combination of a movable electromagnet having an armature separable therefrom for movement between attracted and released positions, thermally responsive valve means movable between controlling positions independently of said armature and having operative engagement with said armature in said released position thereof, means for biasing said armature to said released position and holding said thermally responsive valve means in one of said controlling positions, resetting means operable for moving said electromagnet into engagement with said armature, means effective upon completion of the resetting operation for retracting said electromagnet and causing movement of said armature out of operative engagement with said valve means to free the same for movement to another of said controlling positions, auxiliary valve means movable between controlling positions, an operating member operatively associated with said auxiliary valve means and slidable laterally relative to said electromagnet, cam means movable with said electromagnet and engageable with said operating member during the resetting operation for placing said auxiliary valve means in one of said controlling positions, and detent means movable with said armature for retaining said auxiliary valve means in said one position while said armature is in said attracted position.

2. A control device as claimed in claim 1 wherein said electromagnet is mounted in a movable casing to be movable therewith, said cam means including a cam surface formed on said casing, said detent means including an element having a surface complementary with said cam surface and adapted to be positioned in engagement therewith while said armature is in said attracted position.

3. In a control device, the combination of a movable casing having an electromagnet mounted therein for movement therewith, said electromagnet having an armature separable therefrom for movement between attracted and released positions, thermally responsive valve means movable between controlling positions independently of said armature and having operative engagement with said armature in said released position thereof, means for biasing said armature to said released position and holding said thermally responsive valve means in one of said controlling positions, resetting means operable for moving said electromagnet into engagement with said armature, means effective upon completion of the resetting operation for retracting said electromagnet and causing movement of said armature out of operative engagement with said valve means to free the same for movement to another of said controlling positions, auxiliary valve means disposed laterally of said electromagnet, said auxiliary valve means being movable between controlling positions and biased to one of said positions, an operating pin operatively associated with said auxiliary valve means and slidable laterally relative to said electromagnet, a cam surface formed on said casing and engageable with said pin during said resetting operation for moving said auxiliary valve means against said bias to another of said controlling positions, and detent means movable with said armature and cooperable with said pin for retaining said auxiliary valve means in said other position while said armature is in said attracted position.

4. A control device as claimed in claim 3 wherein said detent means includes an element having a surface complementary with said cam surface and adapted to be positioned in engagement therewith while said armature is in said attracted position.

MICHAEL J. CAPARONE.
CHARLES M. VAUGHN.

References Cited in the file of this patent

UNITED STATES PATENTS

| Number | Name | Date |
|---|---|---|
| 2,290,108 | Mantz | July 14, 1942 |
| 2,542,127 | Ewing | Feb. 20, 1951 |